(12) United States Patent
Khan et al.

(10) Patent No.: US 8,117,041 B1
(45) Date of Patent: Feb. 14, 2012

(54) METHOD OF USING MAP DATA THAT HAS BEEN ORGANIZED FOR AFFINITY RELATIONSHIPS

(75) Inventors: M. Salahuddin Khan, Lake Forest, IL (US); James Herbst, Chicago, IL (US)

(73) Assignee: NAVTEQ B.V., Veldhoven (NL)

( * ) Notice: Subject to any disclaimer, the term of this patent is extended or adjusted under 35 U.S.C. 154(b) by 1389 days.

(21) Appl. No.: 11/473,800

(22) Filed: Jun. 23, 2006

Related U.S. Application Data

(63) Continuation-in-part of application No. 11/072,877, filed on Mar. 3, 2005, now Pat. No. 7,805,317.

(51) Int. Cl.
 *G06Q 10/00* (2006.01)
(52) U.S. Cl. .......................................... 705/1.1
(58) Field of Classification Search .................... 705/1.1
 See application file for complete search history.

(56) References Cited

U.S. PATENT DOCUMENTS

| | | | |
|---|---|---|---|
| 6,061,003 A | 5/2000 | Harada | |
| 6,112,174 A | 8/2000 | Wakisaka et al. | |
| 6,826,472 B1 | 11/2004 | Kamei et al. | |
| 6,836,822 B1 | 12/2004 | Hatano et al. | ................. 711/117 |
| 2002/0111810 A1 | 8/2002 | Khan et al. | |
| 2004/0204833 A1 | 10/2004 | Yokota | |
| 2004/0215390 A1 | 10/2004 | Nomura | |

FOREIGN PATENT DOCUMENTS

| | | |
|---|---|---|
| EP | 1 233 407 A1 | 8/2002 |
| JP | 6331378 A | 12/1994 |
| JP | 2004198223 A | 7/2004 |

*Primary Examiner* — Jonathan Ouellette
(74) *Attorney, Agent, or Firm* — Adil M. Musabji; Frank J. Kozak; Jon D. Shutter

(57) ABSTRACT

A method is disclosed for providing guidance to a destination with a computing system that uses geographic data indexed by affinity relationships. A user specifies a municipality of relatively greater importance that is located nearby the desired actual destination. The computing system provides guidance to the user to follow a route to the specified municipality. While the user is following the route to the specified municipality, additional routes are calculated to each of a plurality of roads that cross into an affinity domain associated with the specified municipality. Before the user reaches the point at which any of the additional routes diverge from the route to the specified municipality, input is obtained from the user, one or more times as needed, specifying either another municipality progressively closer to the desired actual destination or the actual desired destination. Guidance is provided to the user to follow the routes to the closer municipalities or the desired actual destination.

22 Claims, 14 Drawing Sheets

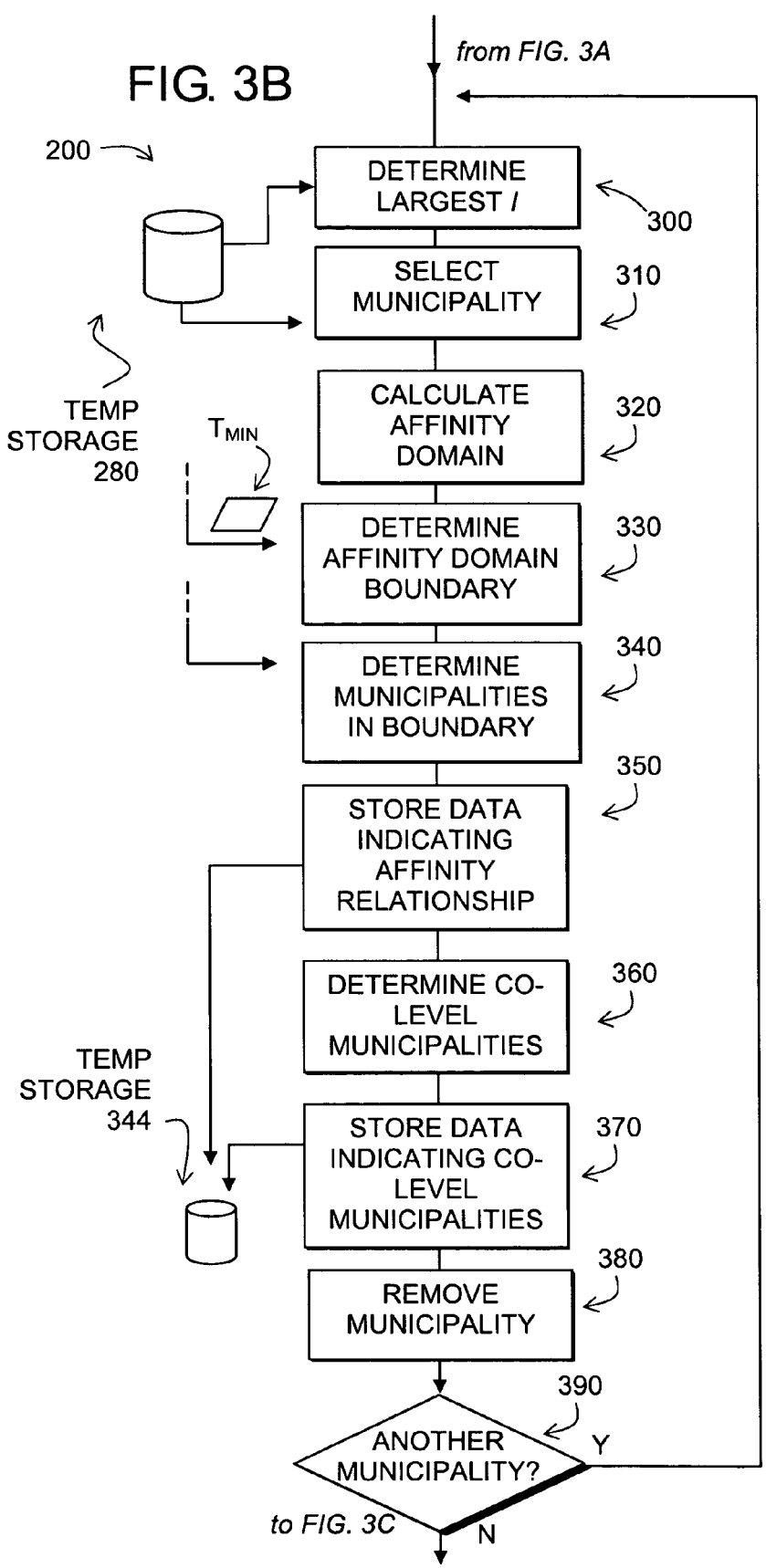

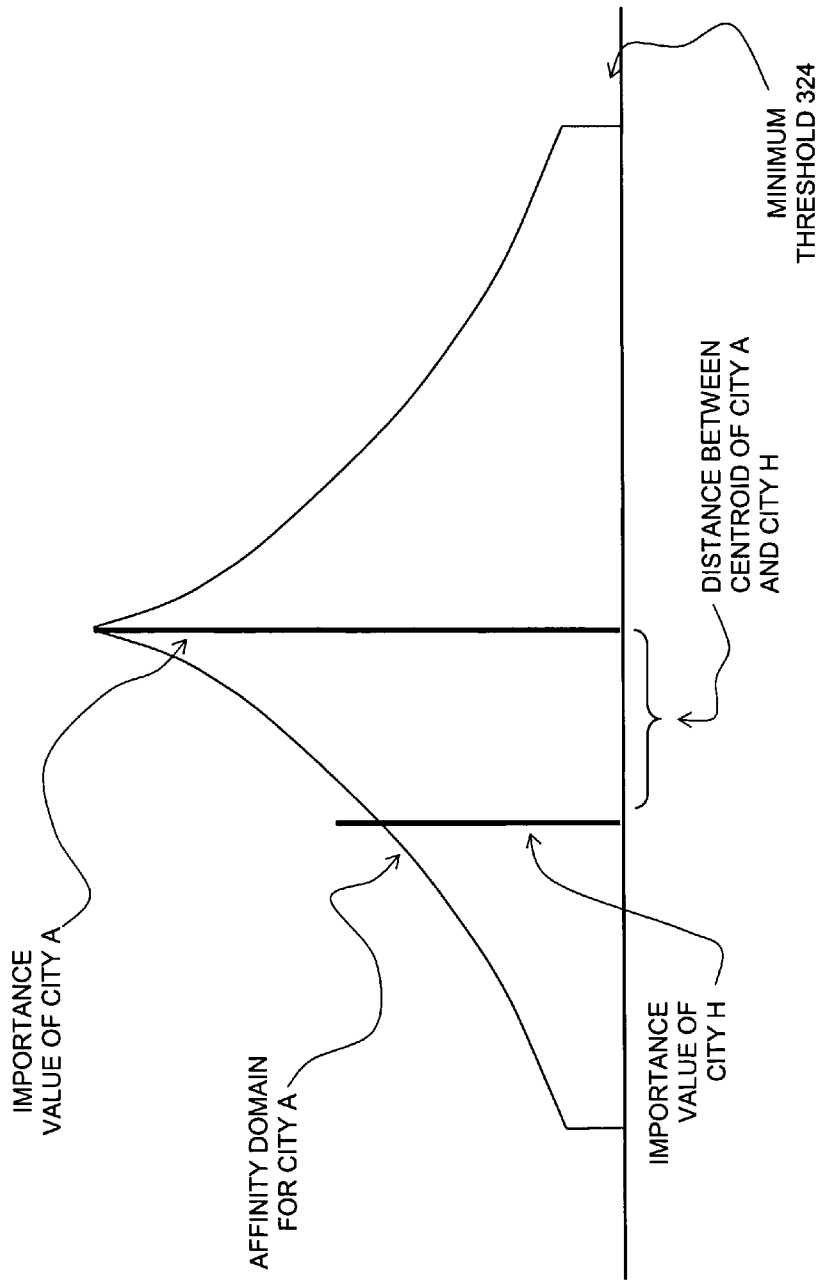

METHOD OF USING MAP DATA THAT HAS BEEN ORGANIZED FOR AFFINITY RELATIONSHIPS

REFERENCE TO RELATED APPLICATION

The present application is a continuation-in-part of the patent application entitled "METHOD OF ORGANIZING MAP DATA FOR AFFINITY RELATIONSHIPS AND APPLICATION FOR USE THEREOF," Ser. No. 11/072,877, filed Mar. 3, 2005 now U.S. Pat. No. 7,805,317, the entire disclosure of which is incorporated by reference herein.

BACKGROUND OF THE INVENTION

The present invention relates to a method for using a geographic database that has been organized or indexed with affinity relationships in order to facilitate specifying destinations.

Navigation-related functions are provided on various different computer platforms. For example, navigation-related functions can be provided with standalone systems or networked systems. In a standalone system, the software applications, geographic data, and hardware are combined at a single location. A standalone system may be installed in a vehicle or carried by a person. In a networked system, some of the software or geographic data are located with the hardware with the user and some of the software or geographic data are located remotely and accessed over a communications system. Navigation-related functions are provided by systems implemented on dedicated platforms in which the hardware and software are specifically designed for navigation purposes. Alternatively, systems that provide navigation-related features can be implemented on general purpose computing platforms (such as personal computers, personal digital assistants, or networked computers) using appropriate software applications and data.

Dedicated navigation systems and general purpose computing platforms that run navigation applications (hereinafter referred to collectively as "navigation systems") provide a variety of useful features and services. For example, navigation systems used in vehicles can provide detailed instructions for driving to desired destinations thereby reducing travel times and expenses. Navigation systems and navigation applications can also search for businesses of a desired type and provide routing guidance to locations of such businesses.

One consideration associated with these systems relates to how places are specified to the system by a user. For example, when a user wishes to obtain guidance from a navigation system for following a route to a destination, it is necessary that the user indicate, by some means, the destination to the system. The function of specifying a destination can be complicated for various reasons. Many systems do not calculate a route or provide guidance until an exact location for the destination has been indicated in its entirety by the user. However, in some cases the user may not know the exact spelling of a city or street. Another possible complication occurs when cities or towns have the same or similar names.

Accordingly, there exists a need for improvements in the way that a location, such as a destination, can be specified by a user to a system. As an example, there is a need for improvements in the way that a user specifies a destination in order to obtain a calculated route.

SUMMARY OF THE INVENTION

To address these and other objectives, the present invention includes embodiments for organizing digital map data to enable fast and convenient destination entry and guidance for navigation systems. There are included two related components. First is a means to index place names in a way that captures, for any given place name, an affinity to one or more potentially more important place names. Each such more important place subtends an affinity domain within which other places are deemed to lie. This carries on hierarchically and has the effect of creating a relatively meaningful and minimized structure that can be rapidly searched for a user's intended destination. The second component uses these affinity domains to determine the instructions necessary to embark upon a guided journey rather than determining all instructions needed to complete the journey.

According to a further aspect, the present invention includes a method for providing guidance to a destination with a computing system that uses geographic data indexed by affinity relationships. A user specifies a municipality of relatively greater importance that is located nearby the desired actual destination. The computing system provides guidance to the user to follow a route to the specified municipality. While the user is following the route to the specified municipality, additional routes are calculated to each of a plurality of roads that cross into an affinity domain associated with the specified municipality. Before the user reaches the point at which any of the additional routes diverge from the route to the specified municipality, input is obtained from the user, one or more times as needed, specifying either another municipality progressively closer to the desired actual destination or the actual desired destination. Guidance is provided to the user to follow the routes to the closer municipalities or the desired actual destination.

BRIEF DESCRIPTION OF THE DRAWINGS

FIGS. 3A, 3B and 3C are a flowchart of a process for forming an affinity relationship index.

FIG. 7A is an illustration showing a relationship between the importance value for a city and the affinity domain shown in FIG. 5.

DETAILED DESCRIPTION OF THE PRESENTLY PREFERRED EMBODIMENTS

I. Overview of Geographic Database Formation

Figure 1:
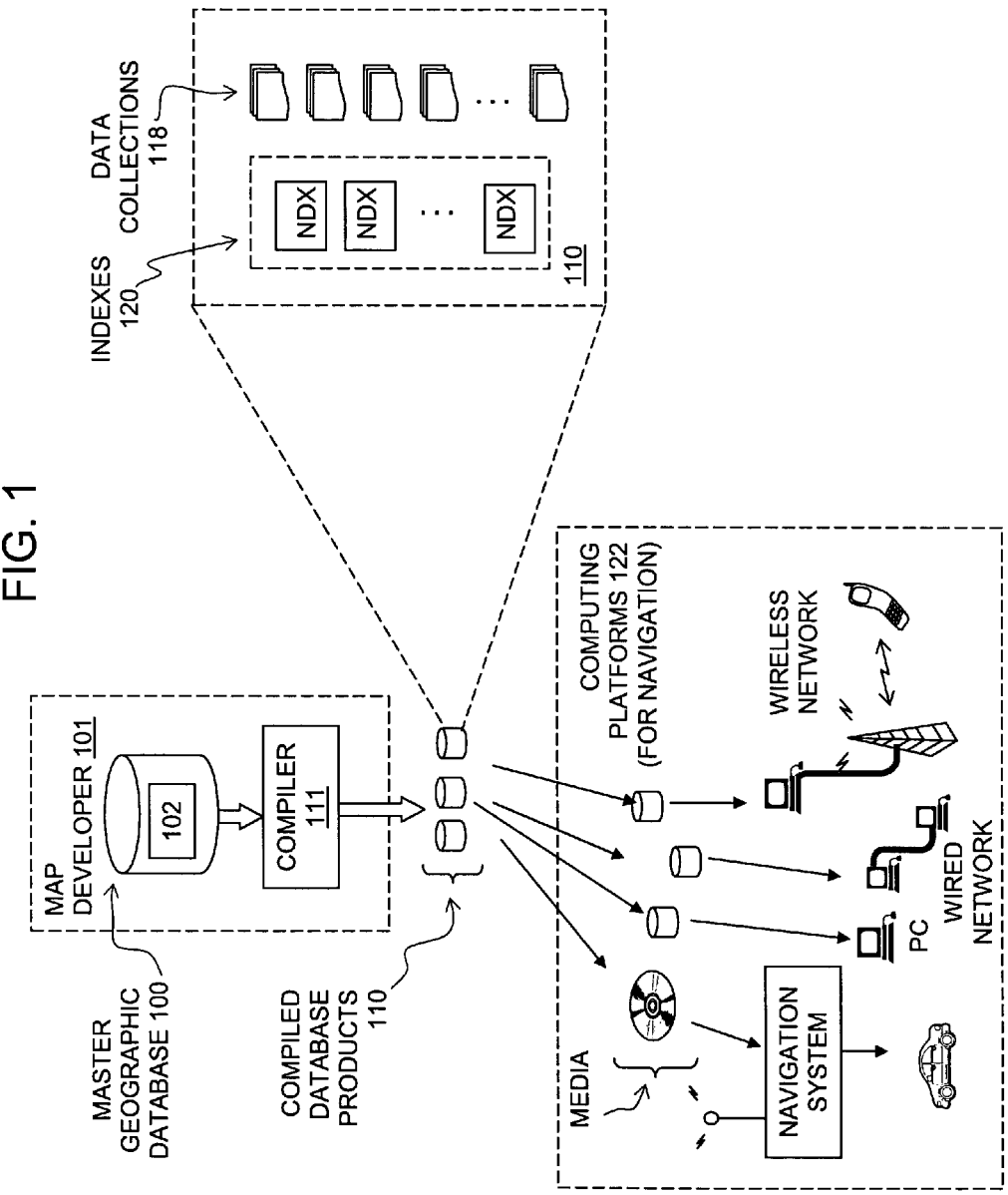
FIG. 1 is an illustration of a process for forming and delivering geographic database products for use in various computing platforms.

FIG. 1 shows a master or source version of a geographic database 100. The master version of the geographic database is owned and developed by a geographic database developer 101 (also referred to as a "map developer", a "map data developer" or the like). (Although only one source database and geographic database developer are shown, the embodiments disclosed herein are not limited to only a single source database or a single geographic database developer.)

The master version of the geographic database 100 contains data 102 (also referred to a "geographic data" or "spatial data") that represent features in a geographic coverage area. The geographic coverage area may correspond to an entire country, such as the United States. Alternatively, the geographic coverage area may correspond to several countries, such as the United States, Canada, and Mexico, or France, Germany, and Italy, and so on. According to another alternative, the geographic coverage area of the master version of the geographic database 100 may represent only a single region within a country, such as the West Coast or the Midwest of the U.S. Although the master version of the geographic database 100 includes data that represent geographic features in the entire geographic coverage area, there may be parts of the geographic coverage area that contain geographic features that are not represented by data in the geographic database, or for which the representation of geographic features is sparse.

The master version of the geographic database 100 includes data about a road network located in the geographic coverage area. The data about the road network include various kinds of information, such as the geographic coordinates of positions of the roads, street names of the roads, addresses ranges along the roads, turn restrictions at intersections of roads, and so on. The master version of the geographic database 100 also includes data about points of interest in the covered geographic area. Points of interest may include hotels, restaurants, museums, stadiums, offices, automobile dealerships, auto repair shops, etc. The master version of the geographic database 100 may include data about the locations of these points of interests. The master version of the geographic database 100 may also include data about places, such as cities, towns, or other communities, and other geographic features, such as bodies of water, mountain ranges, etc. The master version of the geographic database 100 may include other kinds of information.

There are different ways used by the geographic database developer 101 to collect data. These ways include obtaining data from other sources, such as municipalities or aerial photographs. In addition, the geographic database developer 101 may employ field personnel to travel by vehicle along roads throughout the geographic region to observe features and record information about them. The data collected by the geographic database developer 101 are stored in the master version of the geographic database 100.

The geographic database developer 101 continues to collect data that represent the features in the geographic coverage area on an ongoing basis. One reason that the geographic database developer continues to collect data is that the features in the coverage area change over time. Accordingly, the geographic database developer 101 collects data about the same features in order to update or confirm the previously collected data about the features. Another reason that the geographic database developer 101 continues to collect data is to expand the coverage and/or detail of the master version of the geographic database 100. For example, at one point in time the master version of the geographic database 100 may include data that represents only a portion of the entire coverage area. After that point in time, the geographic database developer 101 collects data about features in areas that were not previously represented in order to expand the coverage of the master version of the geographic database 100.

The master version of the geographic database 100 is maintained as the copy that has the most up-to-date data relating to the geographic coverage area. Accordingly, the master version of the geographic database 100 is updated, expanded, and/or otherwise modified on a regular and continuing basis. To facilitate these operations, the master version of the geographic database 100 is stored in a format that facilitates updating, maintenance, and development. For example, the data in the master version 100 may be uncompressed. Examples of suitable formats include the Virtual Storage Access Method (VSAM) format, although other kinds of formats, both proprietary and non-proprietary, may be suitable. In general, the format of the master database 100 is not suitable for use in navigation systems.

In one embodiment, the master version of the geographic database 100 is stored at a location on one or more hard drives, tapes or other media and accessed with an appropriate computer. Any suitable computer may be used, such as a mainframe computer, a plurality of networked microcomputers, etc.

Data from the master version of the geographic database 100 is used to make compiled database products 110. The compiled database products 110 are made using a compiler 111. The compiler 111 is a software program run on an appropriate computer platform. The compiled database products 110 may be produced by the geographic database developer 101 or by another entity, such as a customer of the geographic database developer who acquires or licenses data from the geographic database developer. Prior to production of the compiled database products, data from the master version of the geographic database 100 may be compiled or delivered into one or more intermediate formats, such as the GDF format.

The compiled database products 110 may include only portions of all the data in the master version of the geographic database 100. For example, the compiled database products 110 may include data that relate to only one or more specific sub-areas within the coverage area of the master version of the geographic database 100. Further, the compiled database products 110 may include fewer than all the data attributes that describe geographic features represented in the master version of the geographic database 100.

In the compiled database products 110, the geographic data are organized differently than in the master version of the geographic database 100. A compiled database is organized, arranged, structured and stored in a form that facilitates the use of the data in the computing platform in which it is installed. As an example, in a compiled database product 110, the data may be organized into separate collections 118 of data each of which includes only those attributes needed to perform a specific function. For example, one collection of data may include only those attributes needed to perform route calculation, another of the collections may include only those attributes needed for positioning, while still another of the collections includes only those attributes needed for destination selection.

The compiled database product 110 may also include collections of the geographic data in different levels or scales. For example, one collection of data may include all the roads in a coverage area and another collection of data in the same database may include only higher function class roads, i.e., roads that can carry relatively higher volumes of traffic, such as controlled access roads.

The compiled database 110 may also organize some of the collections of data spatially, i.e., so that geographic features that are close together physically are represented by data that are located close together in the database.

A compiled database may include data entities that are not found in the master geographic database 100. For example, the compiled geographic database 110 may include data entities that are composites of several different data entities in the master geographic database 100 or that are derived from data entities in the master geographic database 100.

A compiled database product may also be stored in a compressed format on the media on which it is located.

The compiled database may also include one or more indexes 120. Various types of indexes 120 may be included, including indexes that relate the various collections of data to each other, indexes for finding data on the medium on which it is stored, and indexes for finding specific information within the collections of data.

Some of the ways in which geographic data can be organized for use in computing platforms are described in U.S. Pat. Nos. 5,953,722, 5,968,109, 5,974,419, 6,038,559, 6,112,200, 6,081,803, 6,118,404, 6,122,593, 6,184,823, 6,249,742, 6,308,177, 6,324,470, 6,336,111, 6,393,149, 6,460,046, 6,473,770, 6,507,850, 6,591,270, 6,600,841, 6,751,629, 6,768,818, 6,782,319, and 6,829,690, the entire disclosures of which are incorporated by reference herein.

II. Use of Geographic Data in Computing Platforms

The compiled database products 110 are used on various kinds of computing platforms 122. The computing platforms 122 include in-vehicle navigation systems, hand-held portable navigation systems, personal computers (including desktop and notebook computers), and other kinds of devices, such as personal digital assistant (PDA) devices, pagers, telephones, etc. The compiled database products 110 are also used on networked computing platforms and environments, including systems connected to the Internet.

The compiled database products 110 that are used in the computing platforms 122 are stored on suitable media. For example, the compiled database products may be stored on CD-ROM disks, hard drives, DVD disks, flash memory, memory cards, or other types of media that are available now or that become available in the future.

On the computing platforms 122, the compiled database products 110 are used by various software applications. For example, the compiled database products 110 may be used by software applications that provide navigation-related functions, such as route calculation, route guidance, vehicle positioning, map display, and electronic yellow pages, as well as other kinds of functions.

Figure 2:
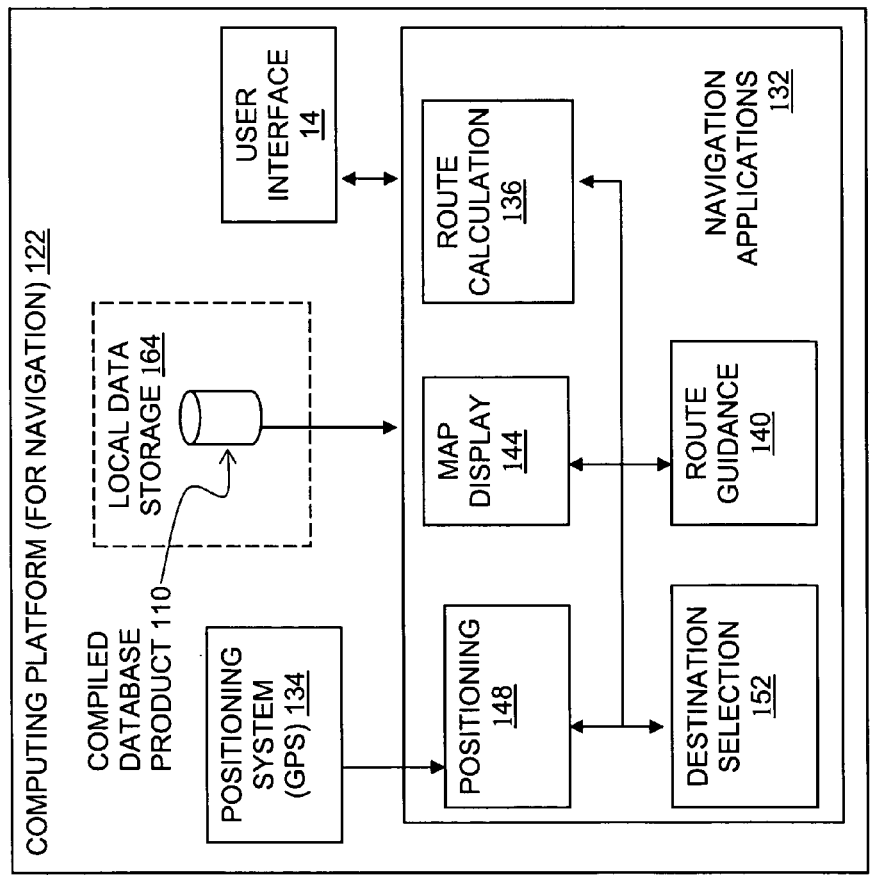
FIG. 2 is a block diagram of one of the systems in FIG. 1 that use a geographic database product.

FIG. 2 shows a block diagram of some of the components of the computing platform 122. The computing platform 122 shown in FIG. 2 is one that includes some components for navigation. The computing platform 122 includes a positioning system 134. The positioning system 134 determines a current position of the portable navigation system 130. The positioning system 134 may be implemented by any location sensing device or technology. For example, the positioning system may include a GPS unit, or systems that use time-of-arrival, direction-of-arrival, triangulation, WiFi, RFID, Loran, dead reckoning, or combinations of these or other systems.

In this embodiment, the computing platform 122 includes navigation applications 132. The navigation applications 132 are software programs that perform certain navigation-related or map-related functions. These navigation applications 132 are stored on an appropriate data storage medium in the computing platform 122. The navigation applications 132 are run, when needed. Included among the navigation applications 132 are a route calculation application 136, a route guidance application 140, a map display application 144, a positioning application 148 and a destination selection application 152. Other embodiments may have more or fewer of these applications. Alternatively, in some embodiments, two or more of these applications may be combined.

The computing platform 122 includes one of the compiled database products 110. The compiled database product 110 is stored on a data storage medium 164 in the computing platform 122. The compiled database product 110 is used by the navigation applications 132 to provide navigation-related features. The map database 160 includes information about the roads, intersections, points of interest, and other geographic features in a covered geographic area. The covered geographic area may include one or more metropolitan areas, states, countries, regions, or combinations thereof.

The navigation applications 132 work together and use the compiled database product 110 to provide various kinds of navigation functions. As an example, the navigation applications may be used for obtaining a route to a desired destination. According to this example, a user may use the destination selection application 152 to find a desired place. The starting point for the route is assumed to be the location of the user, which is determined by the positioning application 148 used in conjunction with the positioning system 134. Data indicating the location of the desired destination and the location of the starting point are forwarded to the route calculation application 136. The route calculation application 36 determines a route from the starting point to the destination and then forwards data indicating the route to the route guidance application 140. The route guidance application 140 generates appropriate directions for the user to follow the route.

When the computing platform 122 is being used to guide the user along a route to a destination, it can be useful to show the user a graphical map of the area in which the user is located. The map display application 144 can be used for this purpose. The map display application 144 receives the data indicating the route from the route calculation application 136 and data indicating the user's current position from the positioning application 148. The map display application 144 accesses data from the compiled database product 110 for generating a graphical map image of the geographic area around the user's current position. The map display application 144 renders an image on a display screen of the computing platform 122 showing the geographic area around the user's current position. The image may show the roads located in the vicinity of the user. An indicator mark may be superimposed on the image to indicate the user's current position. Also, the route that the user should follow may be indicated on the image by highlighting.

III. Formation of the Affinity Relationship Index

Figure 3A:
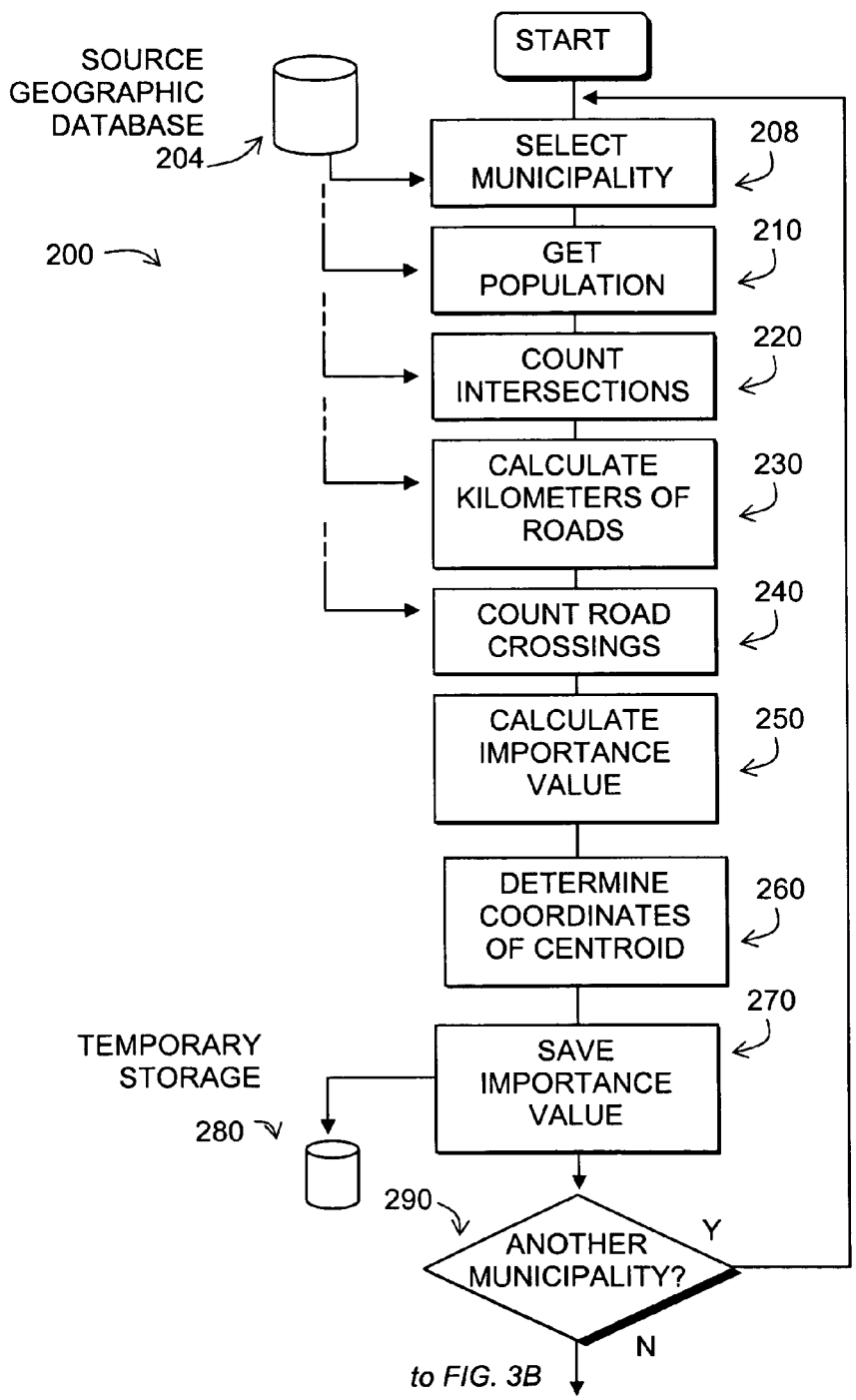
Figure 3C:
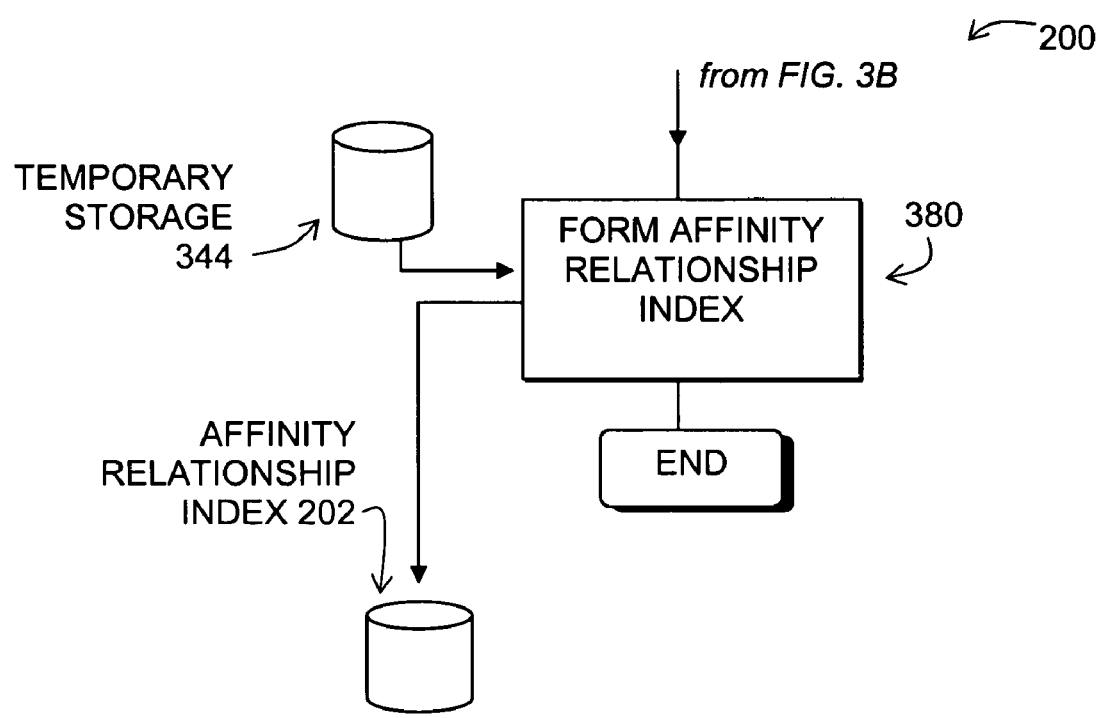

FIGS. 3A, 3B and 3C show a process 200 for forming an affinity relationship index 202. The process 200 may be part of the compilation process performed by the compiler 111 (in FIG. 1) when forming a map database product 110 that is used in suitable computing platforms 122. The process 200 uses data from a source database 204. The source database 204 may be the master geographic database 100 or a database derived from the source database 100, such as a database in an intermediate, interchange, or delivery format. The process 200 uses data from the source database 204 as an input and provides an output in the form of one or more affinity relationship indexes 202. The affinity relationship index 202 may be included among one of the indexes 132, in FIG. 1, which are produced when forming the compiled geographic database product 110.

The process 200 includes a series of steps that are performed for each municipality in a covered region. (For purposes of this specification, the term municipality includes various types of legally organized communities, such as cities, towns, villages, etc., administrative areas, such as counties, townships, and other formally or informally recognized communities, neighborhoods, or socio-cultural geographic or regional areas.) Referring to FIG. 3A, the process 200 selects one municipality from all the municipalities represented in the coverage region of the source database 204 (Step 208). For the selected municipality, the process accesses information from the source database 204 that indicates the population within a polygon that corresponds to the municipality's administrative boundary (Step 210). The process then accesses the source database 204 to determine a count of the number, N, of nodes (i.e., intersections) in the road network located within the polygon (Step 220). Next, the process accesses the source database 204 and calculates the number, K, of kilometers of roads encompassed within the polygon that corresponds to the municipality's administrative boundary (Step 230). Next, the process accesses the source database 204 and counts the number, R, of road crossings of the polygon that corresponds to the municipality's administrative boundary (Step 240).

Using this information obtained or derived from the source database 204, the process calculates an importance value, I, for the municipality (Step 250). The process uses the following formula:

$$I = AP^{\alpha} \times BN^{\beta} \times CK^{\gamma} \times DR^{\delta},$$

where, P is the population within the municipality's administrative bounding polygon, N is the number of nodes in the road network lying within the same polygon, K is the number of kilometers of roads contained within the polygon, and R is the number of road crossings of the polygon's boundary. The upper case coefficients and the lower case exponents are tuning variables that are used to adjust the value of the importance index, I.

Once the process has calculated an importance value for the municipality, a geographic location for the importance value is determined (Step 260). In this embodiment, the geographic coordinates of the centroid of the polygon corresponding to the administrative boundaries of the municipality is determined and used as the geographic location of the importance value. Data indicating the importance value, the centroid location associated with the importance value, and the identity of the municipality are temporarily stored (Step 270). A temporary database 280 or scratch file may be used for this purpose. The process 200 proceeds to select another municipality (Step 290) in the covered region represented by the source database 204 and performs the same steps (i.e., Steps 210, 220, 230, 240, 250 and 260) of accessing the source database 204 to obtain information about the municipality and deriving the information needed to calculate an importance value and associated location (i.e., centroid) for the importance value. The importance value for this municipality, its associated location, and information identifying the associated municipality are stored (Step 270). The process continues to determine and store importance values and associated locations for all the municipalities in the covered region until importance values and associated locations for all the municipalities have been determined and stored in the temporary database 280 (Step 290).

After importance values and corresponding locations have been determined and stored for all the municipalities represented in the source database 204, the process 200 continues by determining an index of affinity relationships for the municipalities represented by the source database 204. In determining affinity relationships, the process uses the importance value determined for each municipality combined with the distance between each municipality to determine which level of the affinity relationship index a municipality occupies and which other municipalities have an affinity relationship with a given municipality.

FIG. 3B shows steps in the process 200 for determining an index of affinity relationships. The process continues by determining the largest importance value and selecting the associated municipality (Steps 300 and 310). An affinity domain for this municipality is calculated (Step 320). The affinity domain defines a circular area in which each point has a value (i.e., an affinity value) that is a function of its distance from the location associated with the municipality, which in this embodiment is the centroid of the polygon formed by the administrative boundary of the municipality. The affinity value at the location of the centroid of the municipality corresponds to the importance value determined for the municipality. This value also is the maximum value of the affinity domain for the municipality. The affinity value for the municipality tapers off equally in all directions. The rate of tapering of the affinity value may be defined by an exponential function, a hyperbolic function, or any other suitable function.

Depending on the function used to define the affinity domain, the affinity value continues to diminish as a function of the distance from the municipality centroid. At some distance from the municipality centroid, the affinity value tapers to a value that corresponds to a pre-determined minimum threshold value $T_{MIN}$. The location at which the affinity value reaches the minimum threshold value $T_{MIN}$ defines the horizontal boundary of the affinity domain for the municipality (Step 330). In an exemplary embodiment, the horizontal boundary of the affinity domain for a large city may correspond roughly to the greater metropolitan area of the city, i.e., the city and its suburbs.

Figure 4:
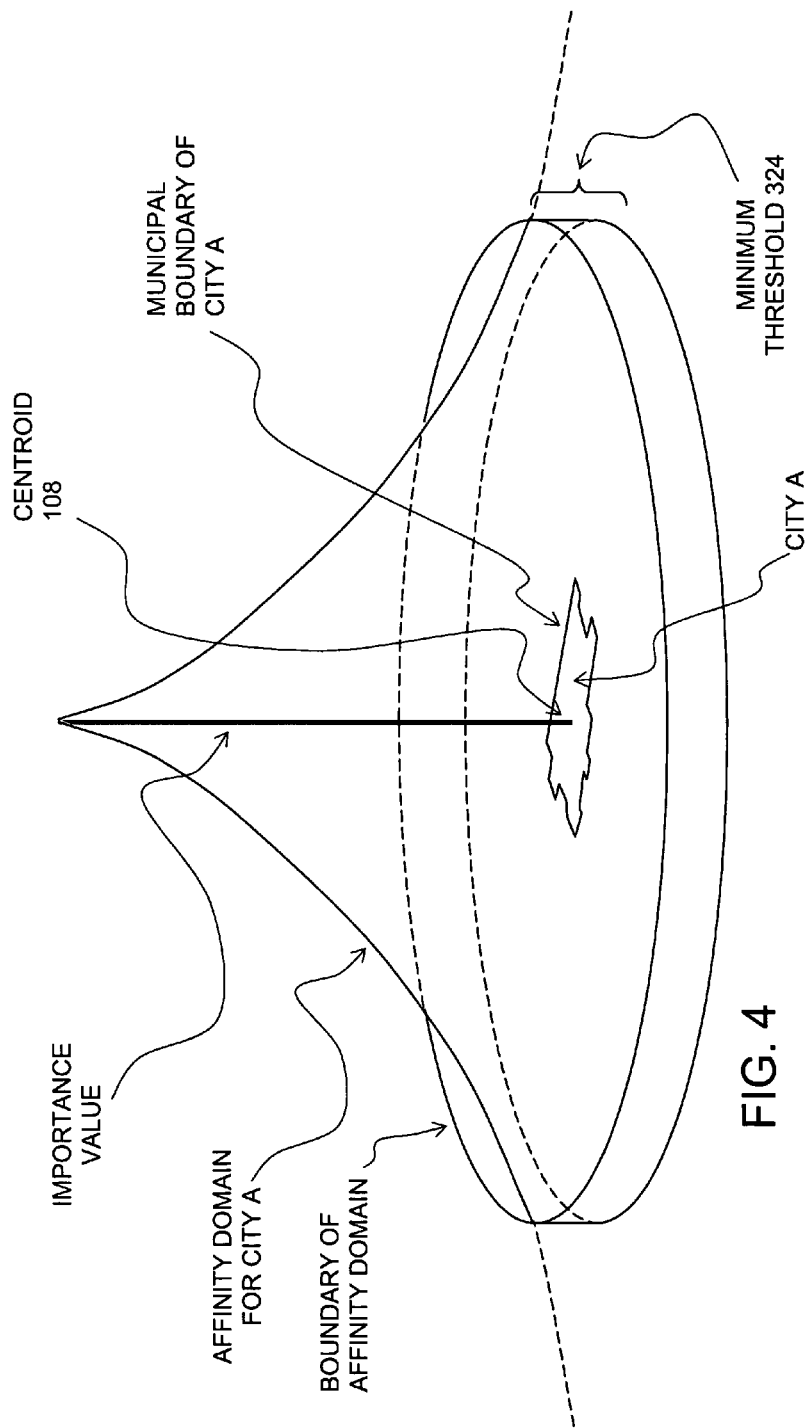
FIG. 4 is an illustration of an affinity domain calculated by the process of FIGS. 3A, 3B and 3C.

FIG. 4 is an illustration of the affinity domain calculated for a municipality, City A. Note that the affinity domain has a peak value corresponding to the importance value, which is located at the centroid of the municipality. The affinity domain tapers axi-symmetrically from the peak to the minimum threshold.

Figure 5:
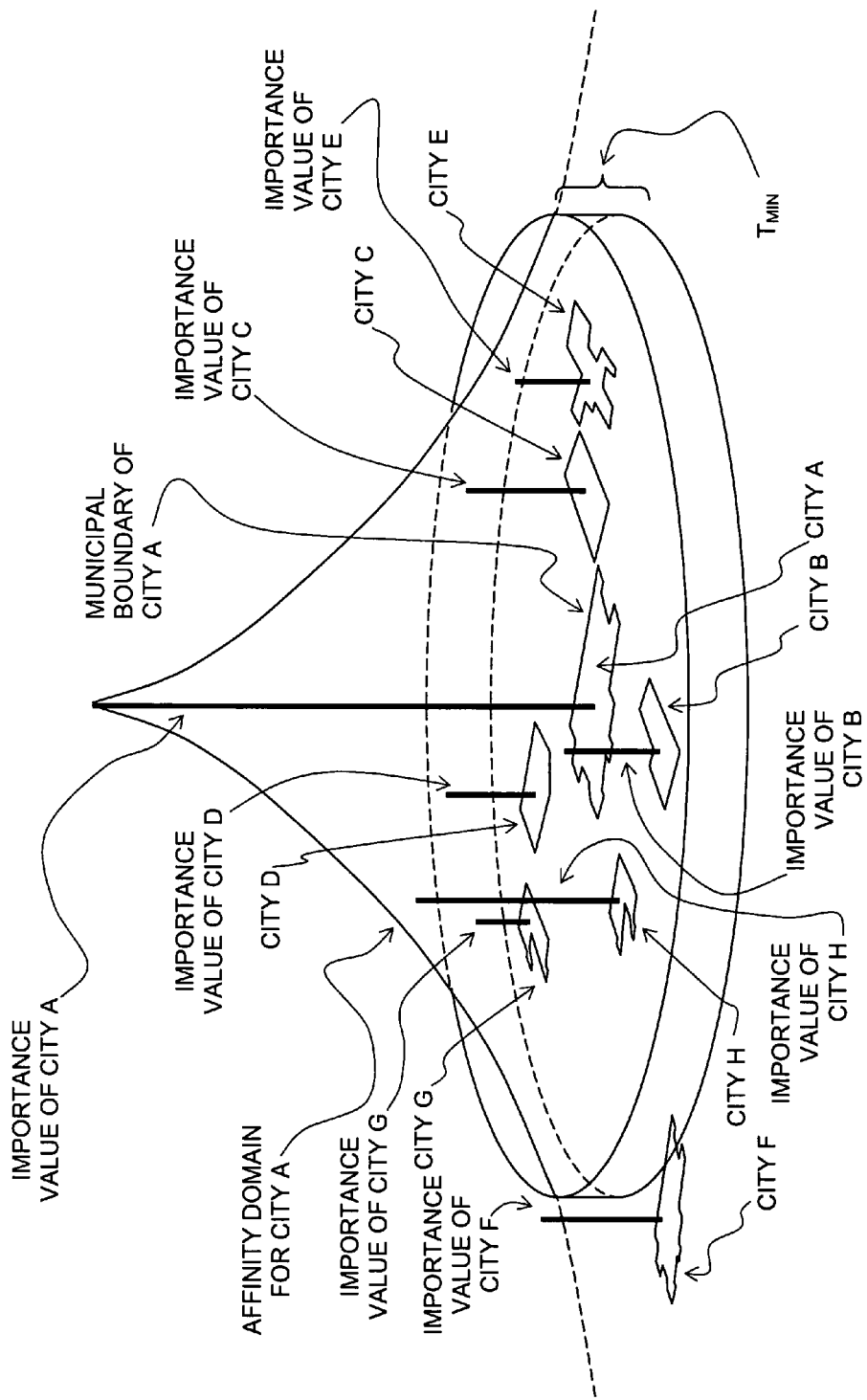
FIG. 5 is another illustration of the affinity domain of FIG. 4 with the addition of importance values for other municipalities shown thereon.

Referring again to FIG. 3B, the process next determines all the importance value locations associated with other municipalities that are encompassed within the geographic area (i.e., footprint) of the affinity domain (Step 340). FIG. 5 is an illustration of the step of determining the other municipalities that have an importance value locations located within the affinity domain. In FIG. 5, Cities B, C, D, E, G, and H have importance values located within the affinity domain of City A. Note that the importance value for City F is not within the affinity domain of City A. (For the sake of simplicity, six municipalities are shown in FIG. 5 as having importance value locations within the affinity domain of City A. In an actual, real-world example, there may be many more municipalities, such as one hundred or more, located within an affinity domain of a large city.)

Figure 6:
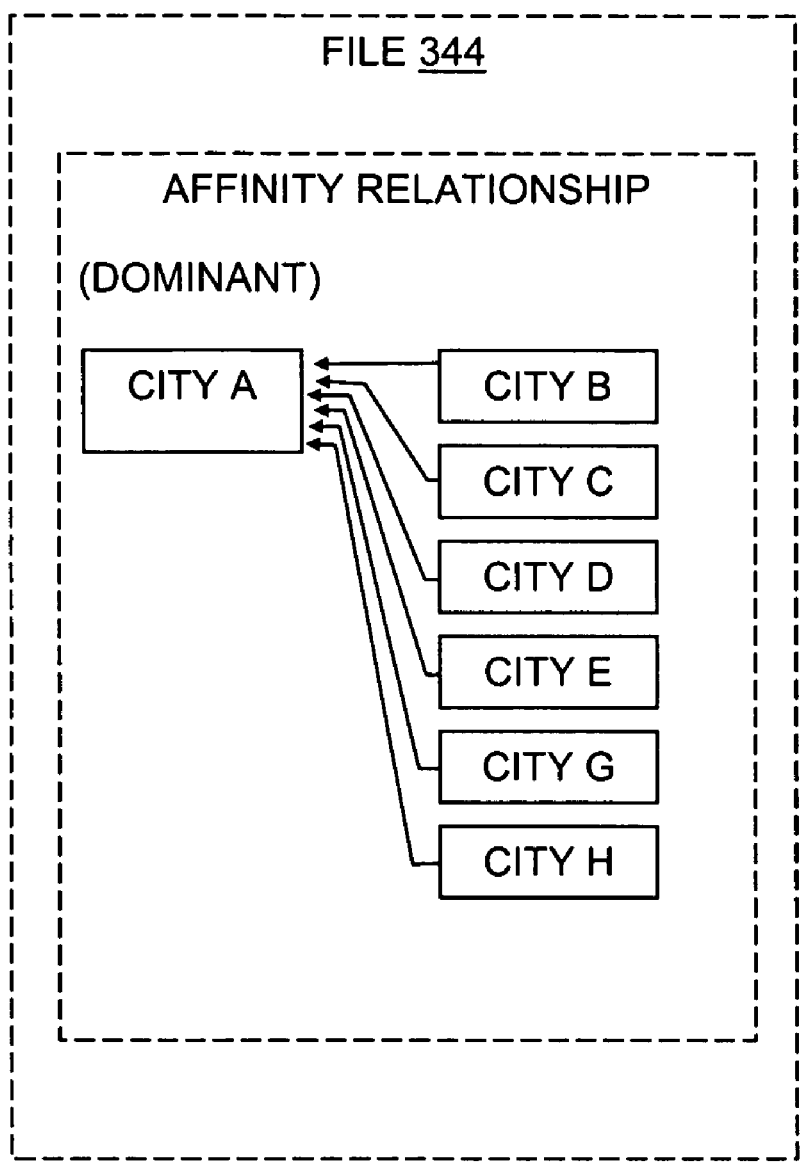
FIG. 6 is a block diagram illustrating organization of a temporary file that contains affinity relationship data produced by the process of FIGS. 3A, 3B and 3C.

Referring again to FIG. 3B, each of the municipalities that has an importance value location located within the affinity domain is determined to have an affinity relationship with the municipality associated with the affinity domain. Data indicating that these municipalities have an affinity relationship with the municipality associated with the affinity domain (referred to in the relationship as the "dominant municipality") is stored in a temporary data file 344 (Step 350). FIG. 6 is an illustration of the affinity relationship information stored in the temporary data file 344.

Referring again to FIG. 3B, the process determines whether any municipalities that have been determined to have an affinity relationship with the municipality associated with the affinity domain are important enough to occupy a position at the same index level as the municipality associated with the affinity domain (Step 360). In order to make this determination, the importance value of each municipality that has an importance value located within the footprint of the affinity domain is compared to the affinity value at that location. A municipality that has an importance value that exceeds the affinity value of its dominant municipality is determined to be important enough to occupy a position at the same index level as the dominant municipality.

Figure 7B:
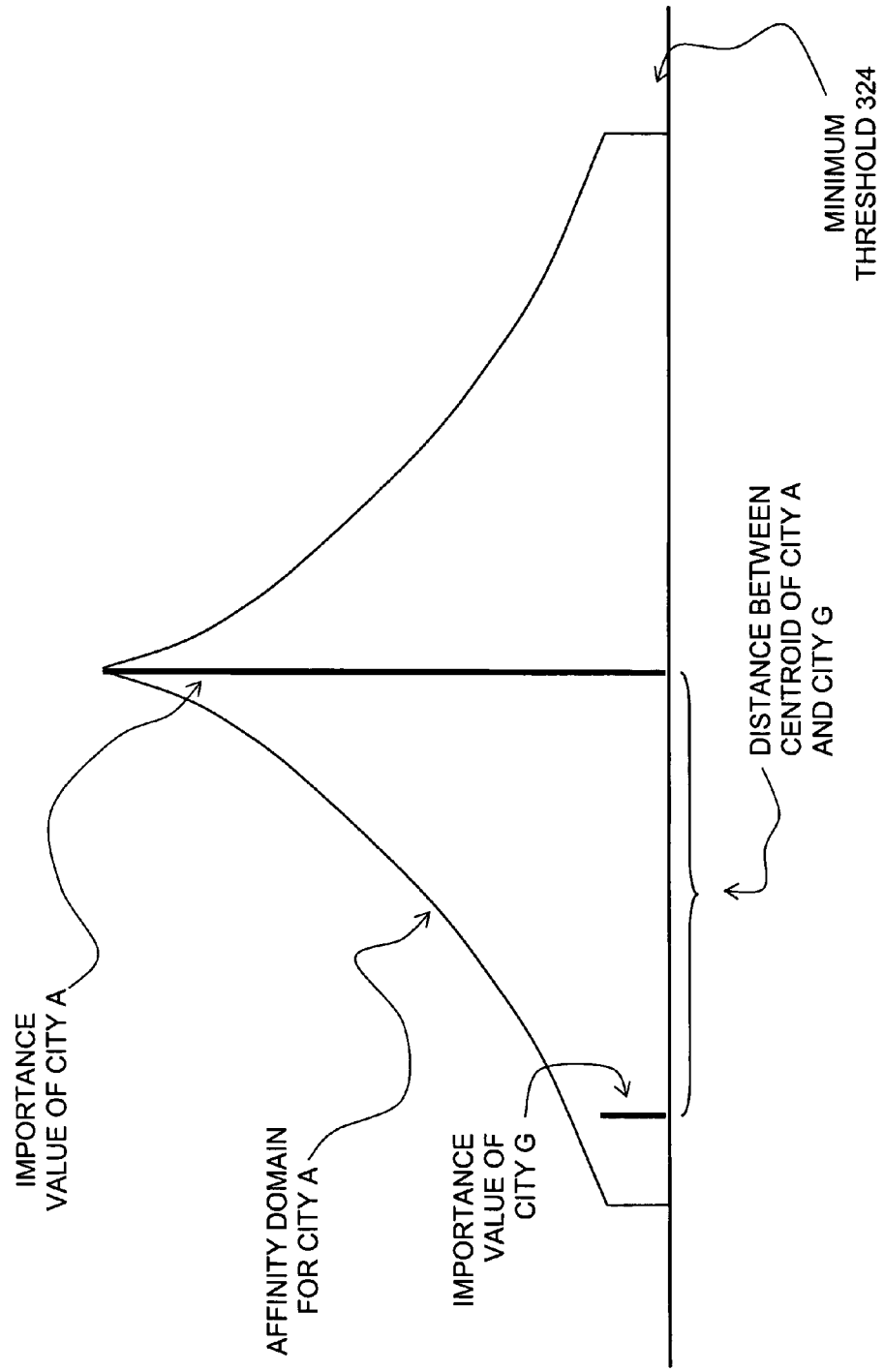
FIG. 7B is another illustration showing a relationship between the importance value for another city and the affinity domain shown in FIG. 5.

FIGS. 7A and 7B are illustrations that show the step of determining whether a municipality has an importance value that exceeds the affinity value of its dominant municipality. FIG. 7A is a vertical cross sectional view of the affinity domain for City A in FIG. 5, in a plane through the locations of the importance values for City A and City H. In FIG. 7A, the importance value for City H is shown to exceed the affinity value domain for City A. Thus, City H is important enough to occupy a position at the same index level as City A. FIG. 7B is a vertical cross sectional view of the affinity domain for City A in FIG. 5, in a plane through the locations of the importance values for City A and City G. In FIG. 7B, the importance value for City G is shown not to exceed the affinity value domain for City A. Thus, City G is not important enough to occupy a position at the same index level as City A.

Referring again to FIG. 3B, after the process has determined which municipalities within the affinity domain are important enough to occupy a position at the same index level as the municipality associated with the affinity domain and which municipalities within the affinity domain are not important enough to occupy a position at the same index level as the municipality associated with the affinity domain, data indicating such determinations is stored in the temporary storage file 344 (Step 370).

The process continues by removing (or marking as finished) the municipality associated with the affinity domain from the temporary database file 280 (Step 380). Then, the process continues by selecting another municipality represented by data in the source database 204 and determining which other municipalities have an affinity relationship with the selected municipality. The process performs the same steps (Steps 300, 310, 320, 330, 340, 350, 360, 370, and 380) with the new selected municipality.

The process 200 continues until affinity domains have been determined for all the municipalities represented in the region covered by the source database 204. If an affinity domain for a selected municipality does not encompass any other municipalities, i.e., if the affinity domain does not encompass the location of the importance value of any other municipality, then no other municipalities have an affinity for the selected municipality.

A municipality may be within the affinity domains of more than one other municipality. In such a case, the municipality has separate affinity relationships with each of the municipalities whose affinity domains encompass it.

When a municipality has an affinity relationship with two or more other municipalities, the two or more other municipalities may be distinct from each other, i.e., neither has an affinity relationship with the other because neither is within the affinity domain of the other. Alternatively, when a municipality has an affinity relationship with two or more other municipalities, the two or more other municipalities may have an affinity relationship with the other, i.e., one is within the affinity domain of the other. This latter situation is illustrated in FIG. 8.

Figure 8:
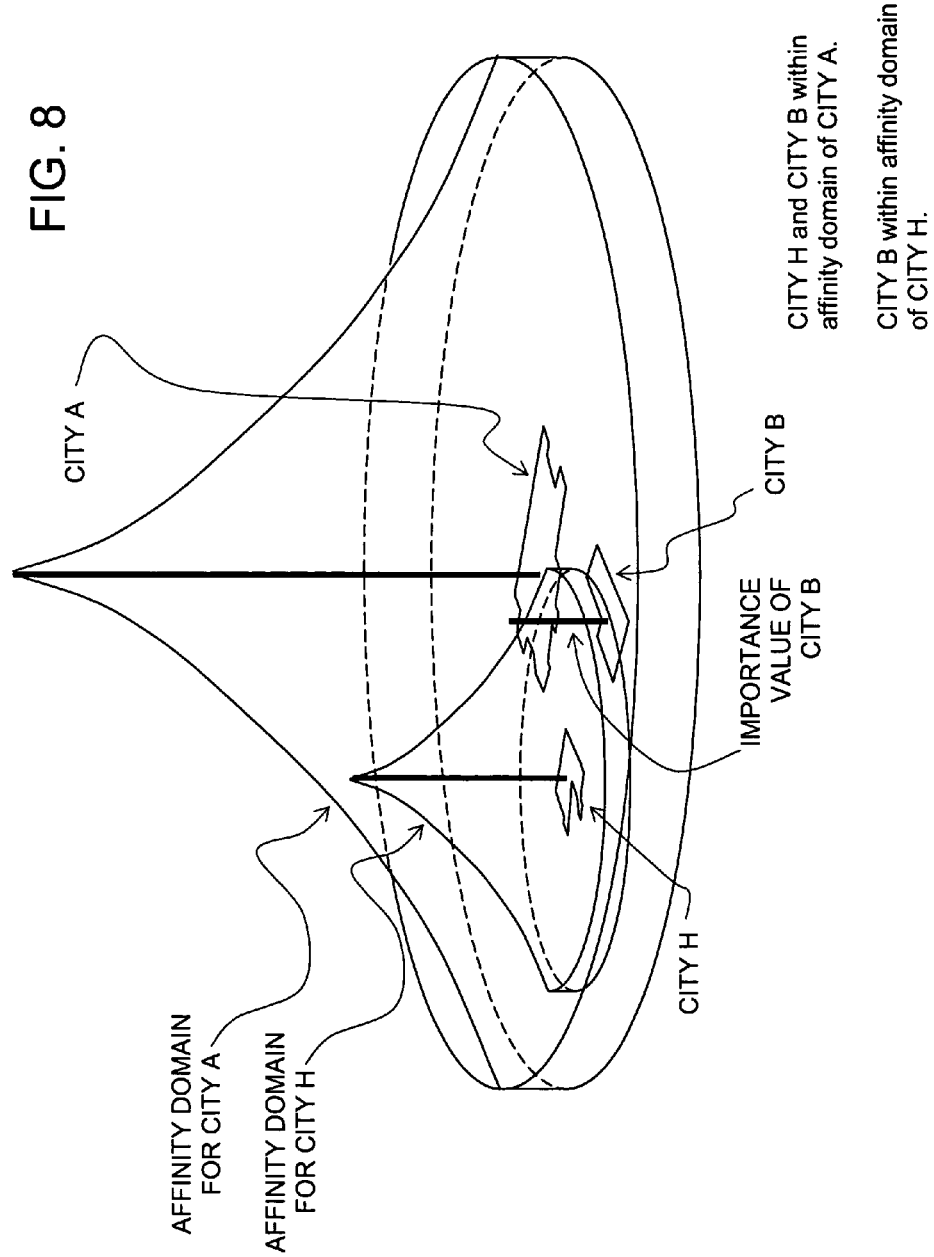
FIG. 8 is an illustration that shows affinity relationships between the municipalities.

In FIG. 8, City B is shown to be within the affinity domains of both City A and City H. Thus, City B will be determined to have an affinity relationship with both City A and City H. City H is within the affinity domain of City A. Thus, City H will be determined to have an affinity relationship with City A.

Referring to FIG. 3C, the process continues by using the temporary data file 344 that contains the affinity relationships determined for all the municipalities represented in the region covered by the source database to produce the affinity relationship index 202. The affinity relationship index 202 includes a hierarchical structure that contains the affinity relationships determined by the affinity domains determined for each municipality in a region covered by the source database 204.

In the affinity relationship index, all the other municipalities that are located within the affinity domain associated with a municipality are deemed to have an affinity relationship with the municipality, unless the municipality associated with the affinity domain was already determined to have an affinity relationship with the other municipality. In other words, if two municipalities are determined to be located in each others affinity domains, the municipality with the lesser importance value is deemed to have an affinity relationship with the municipality with the greater importance value, and not vice versa. Thus, if a large municipality and a small municipality are physically close together so that they are in each others affinity domains, the small municipality would be deemed to have an affinity relationship with the large municipality but the large municipality would not be deemed to have an affinity for the small municipality.

As stated above, the affinity relationship index has a layered hierarchical structure. This structure includes one or more entries at a root layer, one or more entries at a next higher layer, and so on. The entries at each level are pointed to by those municipalities that have an affinity for the entry.

Figure 9:
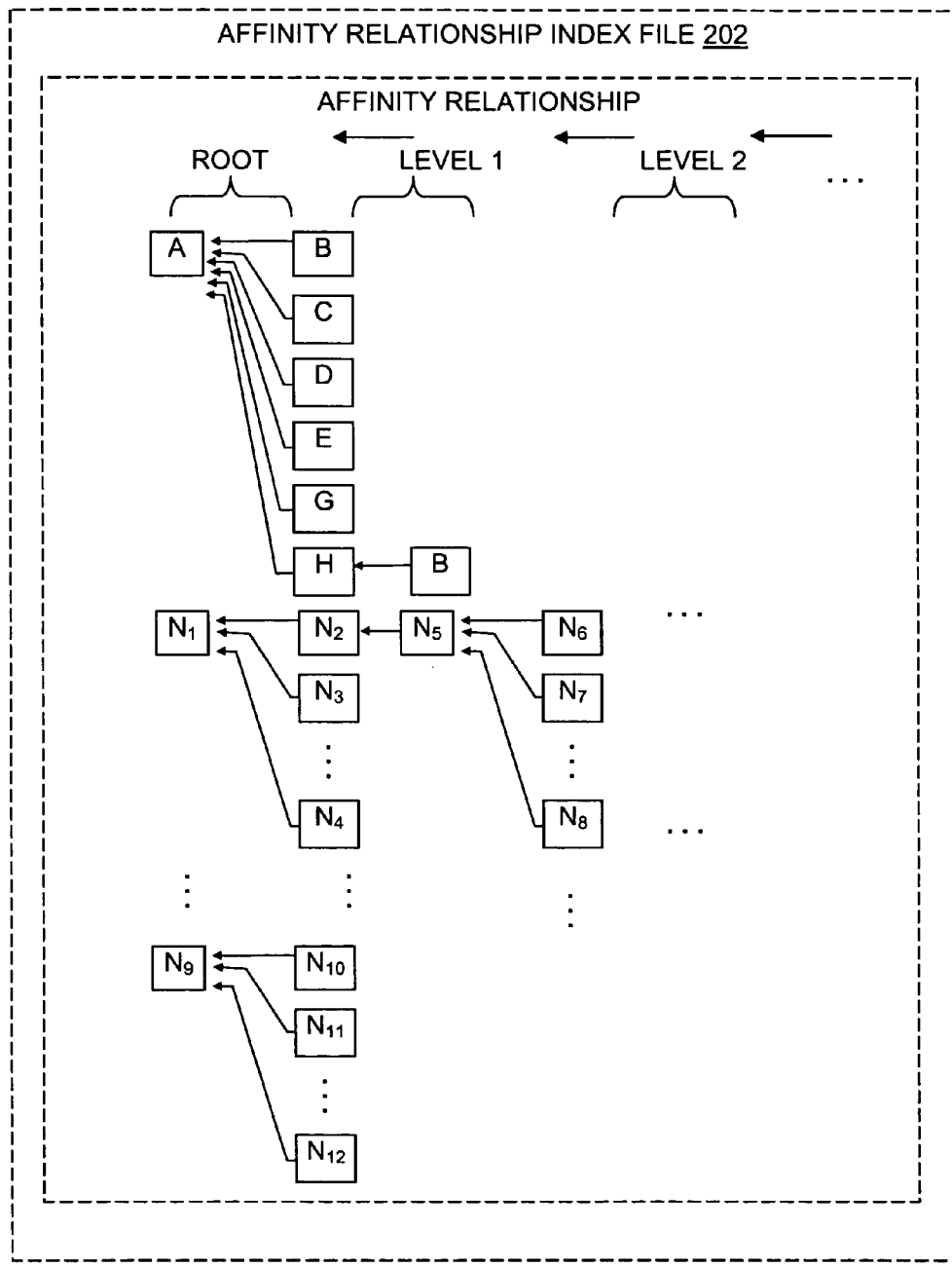
FIG. 9 is a block diagram illustrating components of the affinity relationship index file data produced by the process of FIGS. 3A, 3B and 3C.

FIG. 9 illustrates the organization of the affinity relationship index file 202. The affinity relationship index includes a root layer. The root layer includes a plurality of entries. The entries in the root layer include those municipalities that (1) are not within the affinity domain of any other municipality or (2) are within the within the affinity domain of another municipality but have an importance value that exceeds the value of the affinity domain of that other municipality. As an example, referring to FIG. 7A, the importance value of City H exceeds the value of the affinity domain for City A. Therefore, both City A and City H will occupy positions in the root layer of the affinity relationship index.

Associated with each entry in the root layer are those municipalities that have an affinity relationship with the entry. Data identify these municipalities and indicate that they have an affinity relationship with the municipality in the root layer.

Advantages. The foregoing process provides an ordering method for indexing place names by affinity beginning with a primary index whose root entries are primary communities. Within the index headed by a primary community is a further sub-index of communities of lower and lower levels. Each level represents a sub-directory of subsumed communities. A community on a lower level may appear to be in the affinity of more than one higher level community and may itself be at one level in one case and at another level in the other case. This embodiment of indexation allows for a relatively sparse collection of important cities, for example, the largest conurbations, to occupy the root level directory.

As a result of this form of affinity-based indexation, the embodiment allows any place to be described as "near" another place with some formal meaning to "near." In other words, place name "A" is near place name "B" if it can be found within the directory of "B", and it will be found if its importance value location lies within the affinity domain of "A." In further embodiments, references may be bi-directional.

IV. Use of the Affinity Relationship Index

In one embodiment, the affinity relationship index is part of a geographic database used by a navigation application that is run on a computing platform. In this embodiment, the affinity relationship index is used when a user specifies a place (e.g., a municipality) to the navigation application. For example, the user may specify a place as a destination to which route guidance is desired.

As mentioned above, conventional navigation systems and applications have required that the user provide sufficient information so that the exact location of a destination is specified before a route is calculated and guidance can be given. In some conventional navigation systems and applications, sufficient information included the full exact address of the destination. In a geographic database that includes or uses the affinity relationship index, a user can specify a place in alternative ways. The user can specify a place using the full exact address, as in prior conventional systems, or alternatively, the user can specify a place approximately, such as by indicating other places that the actual desired place is close to.

Figure 10:
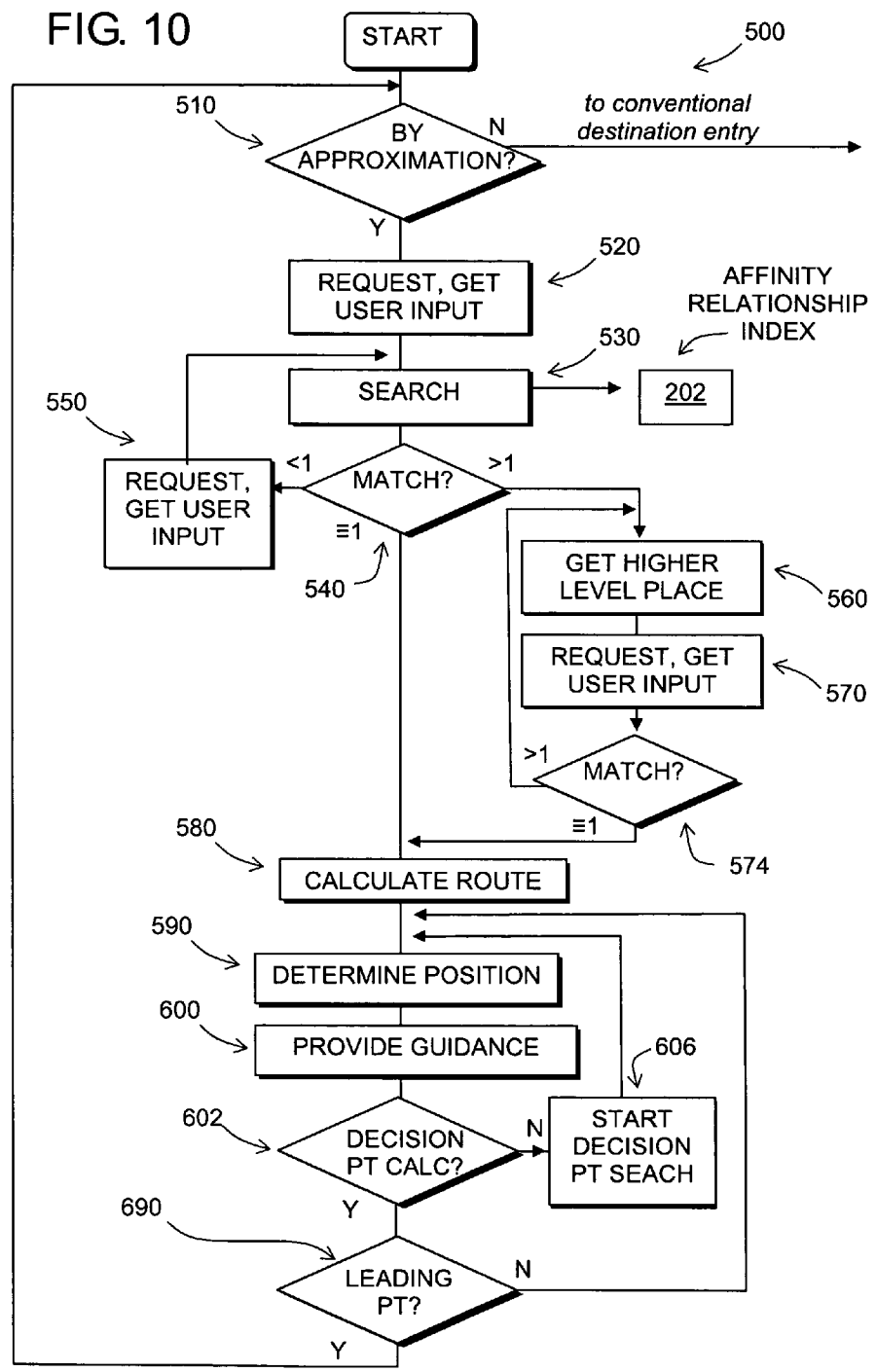
FIG. 10 is a flowchart of a process performed by an application that uses the affinity relationship index file of FIG. 9.

FIG. 10 shows a process 500 for using the affinity relationship index. The process 500 may be part of one of the navigation applications (132 in FIG. 2) in a navigation platform (122 in FIG. 2). The process 500 is described as being used to specify a destination, although in alternative embodiments, the process can be used for specifying a place for any purpose. The process described in FIG. 10 calls for providing information to the user and receiving input from the user. The information may be provided to the user visually or audibly, or in a combination of visually and audibly. The input from the user may be received audibly, by manual input, or by any other means.

According to the process 500, a user is provided with the option to specify a place exactly or approximately (Step 510). If the user chooses to specify a place exactly, the application proceeds to present the user with the appropriate menus and/or prompts for this purpose. These menus and/or prompts for specifying a place exactly may be similar to what has been done by prior conventional systems.

If the user chooses to specify a place approximately, the user is presented with a prompt requesting identification of a place (e.g., municipality) that is close to the actual desired destination (Step 520). The user's input is obtained and used in a search of the affinity relationship index 202. When searching the affinity relationship index 202, the entries may be searched starting with the entries at the root level (Step 530). Other levels may be searched also. After the affinity relationship index has been searched for the place indicated by the user, there are three possible results: there can be no matches, there can be exactly one match, or there can be more than one match (Step 540). If there are no matches, the user is provided with information that the indicated place was not found and is prompted again for the name of a place that the desired destination is near and the affinity relationship index is searched again (Steps 550 and 530). If there is more than one match, it means that there is more than one municipality with the name indicated by the user. In this case, the affinity relationship index is used to obtain additional information about the other places that the place that has the name indicated by the user is near (Step 560). For example, the affinity relationship index may be used to identify which higher level places each of the multiple places with the same name have an affinity for. Then, this information is presented to the user so that the user can select the appropriate place (Steps 570 and 574). For example, if the user indicated "CITY Y" and the affinity relationship index showed that there was one city with the name "CITY Y" with an affinity relationship with CITY X and another city with the name "CITY Y" with an affinity relationship with CITY Z, the user is presented with information indicating that there are cities with the name "CITY Y" close to CITY X and CITY Z. The user is provided with a prompt to select one of these.

Once the process has determined exactly one place that the desired destination is near, a route to the place is calculated (Step 580). This function is performed by the route calculation application (136 in FIG. 2). When calculating the route, the route calculation application uses a point in the indicated nearby place as the destination. For example, the location of the importance value associated with the nearby place (i.e., the centroid of the administrative boundary of the place) may be used. The position of the user is obtained (Step 590). This may be obtained from the positioning system (134 in FIG. 2), if available. Alternatively, the user may be prompted to indicate a current position. The user is provided with guidance for following the calculated route (Step 600).

After the user is provided with guidance for following the calculated route, a background process is started for determining a route decision point (Step 606). The route decision point is that point along the route to the indicated nearby place at which the optimal route to any other place located within the affinity domain of the indicated nearby place diverges from the route to the indicated nearby place. The process of determining a route decision point may be performed as a background process so that the main process 500 may continue, i.e., while the user's new current positions are determined as the user continues to follow the calculated route, and while appropriate guidance is provided to the user to follow the calculated route (Steps 590 and 600, again).

Figure 11:
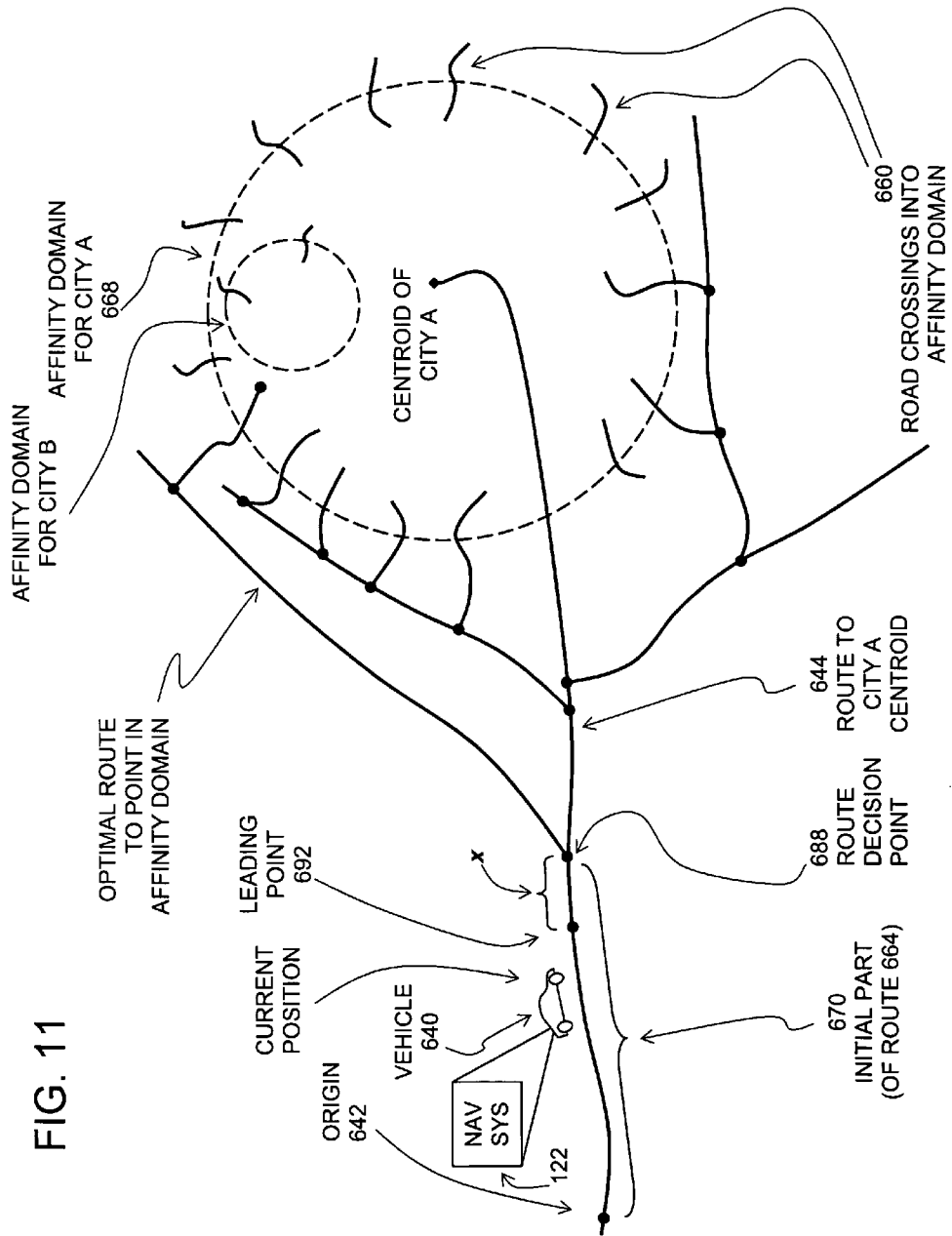
FIG. 11 is an illustration showing how the process in FIG. 10 determines when to obtain additional information from the user in order to refine a route to a destination.

FIG. 11 illustrates how a route decision point is determined. In FIG. 11, when the vehicle 640 in which the navigation platform 122 is installed is at the point 642 (i.e., the ORIGIN), the vehicle operator requests that the navigation platform 122 in the vehicle 640 calculate a route to CITY A (Step 520 in FIG. 10). In this case, the vehicle operator's actual desired destination is in CITY B, but CITY B is a relatively small community nearby CITY A (i.e., within the affinity domain of CITY A). So, the vehicle operator specifies to the navigation system 122 to calculate a route "nearby" or "around" CITY A (Step 510 in FIG. 10). As explained above in connection with FIG. 10, the route to CITY A is calculated (Step 580 in FIG. 10) and guidance for following the route to CITY A is immediately provided to the vehicle operator (Step 600 in FIG. 10). This guidance can be provided quickly because the route to the center of CITY A can be calculated relatively quickly. This has the advantage that vehicle operator can receive initial route guidance very quickly and get started on the route right away.

As further explained in connection with FIG. 10, a background process for determining the route decision point is started (Step 606 in FIG. 10). Referring again to FIG. 11, while the vehicle 640 is on the calculated route 644 to CITY A, the route calculation application in the navigation system 122 determines the route decision point. To determine the route decision point, all the roads 660 crossing into the affinity domain 668 of CITY A are determined. Then, routes to all the roads 660 crossing into the affinity domain 668 from the origin (or current position) of the vehicle are determined. All these routes will initially coincide with the route to the centroid point of the affinity domain of CITY A. In other words, the initial part 670 of a route from the origin 640 to any point within the affinity domain 668 of CITY A will be the same. However, for some point within the affinity domain of CITY A, the optimal route will diverge from the route to the centroid of the affinity domain of CITY A. This point of divergence is the route decision point (labeled 688 in FIG. 11). The route decision point process then determines another point (i.e., a leading point 692) some distance ("x") ahead of the decision point 688 at which to obtain further instructions from the vehicle operator about the desired destination.

Once the decision point has been determined, the vehicle position continues to be determined and guidance provided to the vehicle operator, as appropriate (Steps, 590, 600 and 602). If the vehicle has not yet reached the leading point 692 ahead of the decision point 688, the steps of determining the vehicle position and providing route guidance, as appropriate, continue to be performed (Steps, 590, 600 and 602). However, once the vehicle has reached the leading point 692 ahead of the decision point 688 (Step 690), the process 500 loops back to the step of obtaining input from the vehicle to specify the desired destination (Steps 510 and 520). This time, the vehicle operator may specify the desired destination exactly or may again specify the desired destination by indicating another nearby destination that has an affinity domain that encompasses the actual desired destination. The process 500 continues as described above until the vehicle operator specifies the actual desired destination and the actual desired destination is finally reached.

In the above described process, when determining the route decision point, routes to all the roads crossing into the affinity domain of the nearby location are determined. This step may be modified by calculating routes to only the highest functional class roads (e.g., expressways, interstate highways, limited access roads) that cross into the affinity domain of the nearby location. By limiting calculation of routes to only the highest functional class roads, the number of routes to be calculated is significantly reduced, thereby enabling the route decision point to be determined more quickly. In another alternative, the step of calculating routes to all the roads that cross into the affinity domain of the nearby location may be limited to only those roads of the same or higher functional class as the road on which the vehicle is located. According to still another alternative, routes to higher functional class roads that cross into the affinity domain of the nearby location are calculated before routes to lower functional class roads that cross into the affinity domain of the nearby location. Various other alternatives may be developed for limiting the number of routes that are calculated to roads that cross into the affinity domain of the nearby location.

The process that uses the affinity relationship index provides the advantage that the user does not have to specify an exact address when embarking on a route. Instead, the user can specify a place that the actual desired destination is near. This allows a route to be calculated and guidance provided more quickly than if the user were required to specify an entire exact address as the destination.

V. Alternative Embodiments and Advantages

As mentioned above, the affinity relationship index facilitates specification of places when using a system, such as a navigation system. The affinity relationship system can be used with systems that accept user input manually or through the use of speech or voice commands. When used with speech of voice commands, the affinity relationship index can be used interactively to select a place (municipality) near the actual desired destination and receive route guidance quickly so that the user can embark toward the destination without specifying the entire exact address of the destination to the system. Prior conventional methods have been generally alphabetical in nature or else have forced the user to traverse multiple levels of specificity to select an exact destination. The affinity relationship index provides for a relatively faster, more intuitive way to interactively specify a destination. Another advantage of using the affinity relationship index with a speech recognition system is that it reduces the number of different city names that need to be searched thereby improving the likelihood that the speech recognition system will be able to make the correct match.

In the above embodiments, the affinity relationship index was used to associate names of municipalities with other municipalities that they are close to and which are relatively more important. An alternative embodiment of the affinity relationship index can be used for other kinds of places, such as points of interest. If an affinity relationship index is used for other kinds of places, the importance value algorithm would be modified to include factors and/or parameters that reflect the importance of such kinds of places. Another alternative embodiment of the affinity relationship index can combine municipalities with other kinds of places, such as points of interest, national parks, etc. If an affinity relationship index is used that combines municipalities with other kinds of places, the importance value algorithm would be modified to include factors and/or parameters so that the relative importance values of such kinds of places would be consistent with the importance values of municipalities.

The affinity relationship index can be especially useful for situations in which a user is unfamiliar with the geographic area encompassing the destination or has incomplete information about the destination, but has some knowledge of nearby important locations such as major cities or nationally/regionally important points-of-interest.

The affinity relationship index enables searches using all of the common methods of searching. In addition, the affinity relationship index enables a user to begin the process of destination selection by using a reference to just a large city and then to refine that specification later.

It was stated above that a user may be provided with the option to specify a place exactly or approximately. This option may be presented to the user explicitly or implicitly. For example, the user may be presented with alternative menu choices for either exact specification of a destination address or approximate specification of the destination. Alternatively, the user's input may be used to determine whether an exact destination address is being specified or an approximate destination location is being specified. For example, if the user uses the word "on" or "at", the process infers that the user is specifying the destination exactly. However, if the user uses the word "near", the process infers that the user is specifying the destination approximately, and therefore uses the affinity relationship index to determine a place to which to initially embark on a route toward the destination.

The affinity relationship index and associated programs that use it support vague or incomplete destination entry with progressive refinement, using a natural character of affinity between locations and those of progressively greater or lesser importance.

The affinity relationship index and associated programs that use it provide an advancement over conventional systems that generally use only spatial affinity, i.e. physical nearness. Embodiments of the affinity relationship index include physical nearness as a component in the context of a hierarchy of importance. Additional embodiments may support hierarchies that include political relationships, spatial geometry and historical importance factors.

In an above embodiment, it was described that routes to roads crossing into the affinity domain of a location nearby the actual desired destination are calculated as a background process in order to find a decision point along the route to the nearby location at which the optimum route to another place in the affinity domain of the nearby location diverges from the route to the nearby location. In an alternative embodiment, routes to roads crossing into the affinity domains of some major metropolitan areas may be pre-calculated, i.e., to reduce computation and speed up determining decision points.

It is intended that the foregoing detailed description be regarded as illustrative rather than limiting and that it is understood that the following claims including all equivalents are intended to define the scope of the invention.

We claim:

1. A computer-implemented method of providing guidance to a destination with a computing system comprising:
   receiving input from a user that indicates a municipality that is nearby a desired actual destination;
   calculating, via the computing system, a first route to the municipality that is nearby the desired actual destination;
   providing guidance to the user to follow the first route to the municipality that is nearby the desired actual destination;
   determining additional routes to each of a plurality of roads that cross a boundary into an affinity domain associated with the municipality that is nearby the desired actual destination;
   while on route to the municipality that is nearby the desired actual destination and prior to reaching the point along the first route at which any of the additional routes diverge from the route to the municipality that is nearby the desired actual destination, receiving input from the user that indicates an exact location of the desired actual destination;
   calculating a second route to the desired actual destination; and
   providing guidance to the user to follow the second route to the desired actual destination.

2. The method of claim 1 further comprising:
   after the step of determining additional routes, determining a point along the first route at which any of the additional routes diverge.

3. The method of claim 1 wherein the plurality of roads include all roads that cross the boundary into the affinity domain associated with the municipality that is nearby the desired municipality.

4. The method of claim 1 wherein the plurality of roads include only roads of a highest functional class into the affinity domain associated with the municipality that is nearby the desired municipality.

5. The method of claim 1 further comprising:
   after the step of determining additional routes, determining a leading point that is located a given distance in advance of the point along the first route at which any of the additional routes diverge, and
   wherein the input from the user that indicates the exact location of the desired actual destination is obtained in response to an inquiry to the user provided at the leading point.

6. The method of claim 1 wherein the affinity domain of a municipality defines a set of values that diminishes as a function of the distance from a location associated with an importance value determined for the municipality.

7. The method of claim 1 further comprising:
   before calculating the first route to the municipality that is nearby the desired actual destination, using an affinity relationship index that relates municipalities to other municipalities based on importance of the other municipalities.

8. The method of claim 1, wherein the step of determining additional routes is performed as a background process.

9. The method of claim 1, wherein the step of determining additional routes is performed using pre-calculated routes.

10. The method of claim 1, wherein the step of determining additional routes is performed while providing guidance to the user to follow the first route to the municipality that is nearby the desired actual destination.

11. The method of claim 1, wherein the step of determining additional routes is performed while determining a current position of the user.

12. A computer-implemented method of providing guidance to a destination with a computing system comprising:
   (i) receiving input from a user that indicates a first municipality that is nearby a desired actual destination;
   (ii) calculating, via the computing system, a first route to the first municipality that is nearby the desired actual destination;
   (iii) providing guidance to the user to follow the first route to the first municipality that is nearby the desired actual destination;
   (iv) determining additional routes to each of a plurality of roads that cross a boundary into an affinity domain associated with the first municipality that is nearby the desired municipality;
   (v) while on route to the municipality that is nearby the desired actual destination and prior to reaching the point along the first route at which any of the additional routes diverge, performing steps (i)-(iv) one or more times for additional municipalities that are progressively closer to the desired actual destination;
   (vi) while on route to one of the municipalities that is nearby the desired actual destination and prior to reaching the point along the first route at which any of the additional routes diverge, receiving input from the user that indicates an exact location of the desired actual destination;
   (vii) calculating a second route to the desired actual destination; and
   (viii) providing guidance to the user to follow the second route to the desired actual destination.

13. The method of claim 12 further comprising:
after the step of determining additional routes, determining a point along the first route at which any of the additional routes diverge.

14. The method of claim 12 wherein the plurality of roads include all roads that cross the boundary into the affinity domain associated with the municipality that is nearby the desired municipality.

15. The method of claim 12 wherein the plurality of roads include only roads of a highest functional class into the affinity domain associated with the municipality that is nearby the desired municipality.

16. The method of claim 12 further comprising:
after the step of determining additional routes, determining a leading point that is located a given distance in advance of the point along the first route at which any of the additional routes diverge, and
wherein the input from the user that indicates the exact location of the desired actual destination is obtained in response to an inquiry to the user provided at the leading point.

17. The method of claim 12 wherein the affinity domain of a municipality defines a set of values that diminishes as a function of the distance from a location associated with an importance value determined for the municipality.

18. The method of claim 12 further comprising:
before calculating the first route to the municipality that is nearby the desired actual destination, using an affinity relationship index that relates municipalities to other municipalities based on importance of the other municipalities.

19. The method of claim 12, wherein the step of determining additional routes is performed as a background process.

20. The method of claim 12, wherein the step of determining additional routes is performed using pre-calculated routes.

21. The method of claim 12, wherein the step of determining additional routes is performed while providing guidance to the user to follow the first route to the municipality that is nearby the desired actual destination.

22. The method of claim 12, wherein the step of determining additional routes is performed while determining a current position of the user.

* * * * *